UNITED STATES PATENT OFFICE.

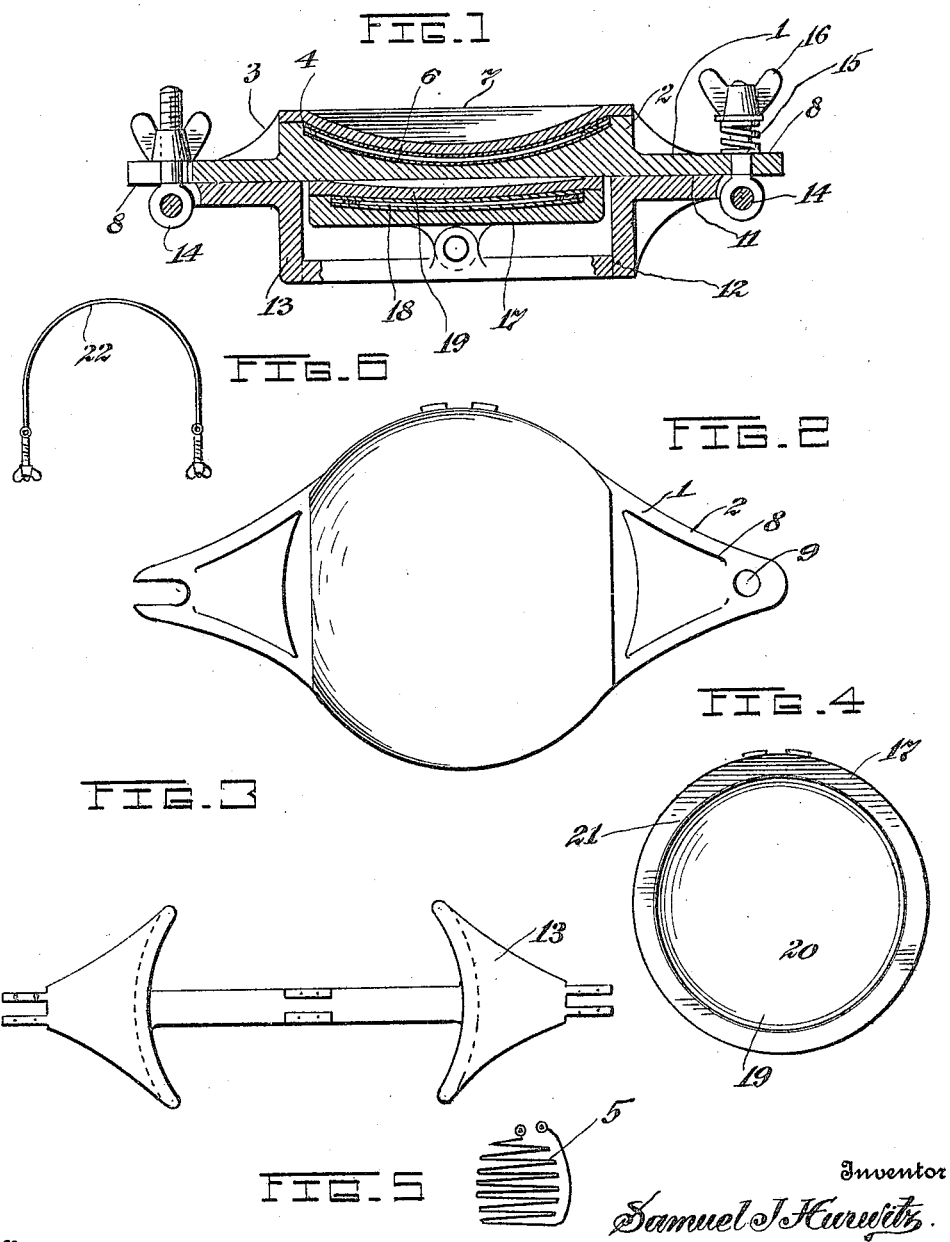

SAMUEL J. HURWITZ, OF YOUNGSTOWN, OHIO.

VULCANIZING DEVICE.

1,383,951. Specification of Letters Patent. Patented July 5, 1921.

Application filed October 15, 1918, Serial No. 258,140. Renewed December 11, 1920. Serial No. 430,046.

*To all whom it may concern:*

Be it known that I, SAMUEL J. HURWITZ, a citizen of Russia, residing at Youngstown, in the county of Mahoning and State of Ohio, have invented new and useful Improvements in Vulcanizing Devices, of which the following is a specification.

This invention relates to a vulcanizing device and has for its primary object to provide a vulcanizing device of simple substantial construction capable of vulcanizing a tire casing as well as an inner tube.

An object of the invention is to provide a device consisting of two major elements detachably connected together so that one element can be used independently of the other or both used jointly in the vulcanizing operation.

Besides the above my invention is distinguished in the novel manner of connecting the elements together so as to have a yieldable connection with each other for assuring an even pressure between the device and the article being vulcanized.

With these and other objects in view the invention will be better understood from the following detailed description taken in connection with the accompanying drawing wherein:

Figure 1 is a sectional view through the device.

Fig. 2 is a top plan view of the upper element.

Fig. 3 is a top plan view of the lower element.

Fig. 4 is a plan view of the heating member of the lower element.

Fig. 5 is a diagrammatic view of the heat coil.

Fig. 6 is a detailed view of the flexible clamp to be used with my invention.

Again referring to the drawing which illustrates one form which my invention may assume, the numeral 1 designates an upper vulcanizing element consisting of a body 2 having a concave recess 3 in which the heater 4 is arranged, shown in this particular instance as consisting of a heat coil 5 arranged between two mica disks 6. Covering the heat coil is a plate 7 of concavo-convex configuration and secured to the body 2 in any suitable manner. The plate 7 is preferably of copper, though it may be of any other material of high heat conductivity without affecting my invention. Extending from the body 2 are wings 8, one of which is provided with a circular opening 9 and the other with a slot. The under surface 11 of the element 1 is flat for a purpose to be described.

The lower vulcanizing element 12 consists of a frame 13 having pivotally connected thereto eye bolts 14 passing through the opening 9 and slot. One of the bolts has arranged thereon a coil spring 15 between the nut 16 thereof and the wing 8 so as to allow a yieldable separation between the body 2 and frame 13. Pivotally connected to the frame 13 is a heating member 17 having arranged therein a heater 18 covered by a plate 19 having a concave depression 20 surrounded by a flat surface 21 so as to insure proper pressure upon the tube to be vulcanized.

From the foregoing description it will be seen that when a tire casing is to be vulcanized the same is arranged upon the plate 7 and a flexible clamp 22 may be used for clamping this casing in tight contact with the plate 7. When the tire casing is arranged in place current is passed through the coil 5 to generate the degree of heat. At this point I wish to call attention to the fact that in the circuit of the coil 5 may be arranged a thermostat for limiting the heating effect of the coil 5. When a tire casing is to be vulcanized the upper element 1 is separated from the lower element whereas when an inner tube is to be vulcanized both elements are clamped together as shown in Fig. 1, with the inner tube resting upon the plate 19.

With reference to the use of my novel device for vulcanizing an inner tube, it will be appreciated that to attain a successful vulcanization, the opposed layers of rubber must rest absolutely flat and be subjected to even pressure throughout the area to be vulcanized. The displaceable capacity of the heating member 17 enables the said member 17 to lend itself to the said result, this for the reason that irrespective of any inclination of the element 12 to the element 1, the element 17 will accommodate itself to the interposed tube and will rest in parallelism with the opposed flat surface of the element 1. I would also have it understood here that the plate 7 is not necessarily of concavo-convex configuration in cross section. Manifestly said plate 7 may be comparatively flat without affecting my invention.

Having described my invention, what I claim is:

1. A vulcanizing device comprising an element having a vulcanizing surface, a heating member in said element, a second element having a rockable vulcanizing surface and also having an individual heating member complementary to and rockable with said surface, and means at opposite sides of said surfaces to hold the elements together under pressure.

2. A vulcanizing device comprising a vulcanizing element having a vulcanizing surface, a heating member arranged in said element, a second vulcanizing element having a rockable vulcanizing surface and also having an individual heating member complementary to said surface, and pressure-exerting means detachably and adjustably connecting the vulcanizing elements together at opposite sides of the rockable vulcanizing surface of the second-named element.

In testimony whereof I affix my signature.

SAMUEL J. HURWITZ.